United States Patent
Rector et al.

(10) Patent No.: US 10,659,168 B2
(45) Date of Patent: May 19, 2020

(54) LOW-POWER FIBER OPTIC TRANSCEIVER

(71) Applicant: Schweitzer Engineering Laboratories, Inc., Pullman, WA (US)

(72) Inventors: David M. Rector, Pullman, WA (US); Raymond W. Rice, Pullman, WA (US); Steven Watts, Pullman, WA (US); Vince B. Hadley, Moscow, ID (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 0 days.

(21) Appl. No.: 15/683,438

(22) Filed: Aug. 22, 2017

(65) Prior Publication Data

US 2018/0062749 A1    Mar. 1, 2018

Related U.S. Application Data

(60) Provisional application No. 62/378,521, filed on Aug. 23, 2016.

(51) Int. Cl.
*G02F 1/035* (2006.01)
*G02F 1/295* (2006.01)
(Continued)

(52) U.S. Cl.
CPC ....... *H04B 10/504* (2013.01); *H04B 10/0799* (2013.01); *H04B 10/07955* (2013.01);
(Continued)

(58) Field of Classification Search
CPC ...... G02B 6/4251; G02B 6/12; G02B 6/4245; H04J 14/0212; H04J 14/0221;
(Continued)

(56) References Cited

U.S. PATENT DOCUMENTS

| 3,532,158 A | 10/1970 | Hiebert |
|---|---|---|
| 5,752,011 A | 5/1998 | Thomas |

(Continued)

FOREIGN PATENT DOCUMENTS

| JP | 58023500 | 8/1981 |
|---|---|---|
| WO | 2006069173 | 4/2009 |

OTHER PUBLICATIONS

PCT/US2017/048141 Patent Cooperation Treaty, International Search Report and Written Opinion of the International Searching Authority, dated Nov. 2, 2017.

(Continued)

*Primary Examiner* — Kaveh C Kianni
*Assistant Examiner* — Hung Q Lam
(74) *Attorney, Agent, or Firm* — Jared L. Cherry

(57) ABSTRACT

The present disclosure pertains to systems and methods for low-power optical transceivers. In one embodiment, a low-power optical transceiver may include a microcontroller and an optical receiver and an optical transmitter in communication with and controlled by the microcontroller. The optical receiver may include a photodetector configured to receive a first optical representation of a first signal to be received and to generate an electrical representation of the first signal. An amplifier may amplify the electrical representation of the first signal, and an output in electrical communication with the amplifier may generate an electrical output. The optical transmitter may include a laser diode configured to generate a second optical representation of a second signal to be transmitted. The microcontroller may be configured to control an output power of the laser diode.

23 Claims, 3 Drawing Sheets

(51) Int. Cl.
*G02B 6/12* (2006.01)
*H04B 10/50* (2013.01)
*H04B 10/69* (2013.01)
*H04B 10/40* (2013.01)
*H04B 10/079* (2013.01)
*H04B 10/43* (2013.01)
*H04B 10/564* (2013.01)
*H04J 14/02* (2006.01)

(52) U.S. Cl.
CPC ............ *H04B 10/40* (2013.01); *H04B 10/43* (2013.01); *H04B 10/564* (2013.01); *H04B 10/69* (2013.01); *H04J 14/0221* (2013.01)

(58) Field of Classification Search
CPC ........... H04B 10/504; H04B 10/07955; H04B 10/43; H04B 10/564; H04B 10/0799
USPC .................................................... 385/2, 8, 14
See application file for complete search history.

(56) References Cited

U.S. PATENT DOCUMENTS

| | | | |
|---|---|---|---|
| 5,767,999 | A | 6/1998 | Kayner |
| 6,188,494 | B1 | 2/2001 | Minteer |
| 6,431,765 | B1 | 8/2002 | Chen |
| 6,526,113 | B1 | 2/2003 | Gutierrez |
| 6,570,768 | B2 | 5/2003 | Medina |
| 6,634,803 | B2 | 10/2003 | Brezina |
| 6,667,883 | B1 | 12/2003 | Solis |
| 6,748,041 | B1 | 6/2004 | Gutierrez |
| 6,752,663 | B2 | 6/2004 | Bright |
| 6,804,116 | B2 | 10/2004 | Owens |
| 6,816,376 | B2 | 11/2004 | Bright |
| 6,822,860 | B2 | 11/2004 | Owens |
| 6,868,219 | B2 | 3/2005 | Lipski |
| 6,973,230 | B1 | 12/2005 | Mackay |
| 7,001,217 | B2 | 2/2006 | Bright |
| 7,111,465 | B2 | 9/2006 | Bell |
| 7,313,500 | B2 | 12/2007 | Morman |
| 7,630,632 | B2 | 12/2009 | Dolfi |
| 7,637,672 | B1 | 12/2009 | Li |
| 7,723,760 | B2 | 5/2010 | Henderson |
| 7,898,808 | B2 | 3/2011 | Joiner |
| 8,175,462 | B2 | 5/2012 | Wong |
| 8,339,784 | B2 | 12/2012 | Pirillis |
| 8,358,504 | B2 | 1/2013 | McColloch |
| 9,042,096 | B2 | 5/2015 | Thomas |
| 9,235,017 | B1 | 1/2016 | Meadowcroft |
| 2002/0009905 | A1 | 1/2002 | Poplawski |
| 2002/0114141 | A1 | 8/2002 | Medina |
| 2003/0128411 | A1* | 7/2003 | Aronson ............... G01M 11/00 398/139 |
| 2003/0161108 | A1 | 8/2003 | Bright |
| 2004/0047564 | A1 | 3/2004 | Chiu |
| 2004/0190669 | A1 | 9/2004 | Gutierrez |
| 2004/0208207 | A1 | 10/2004 | Kasper |
| 2005/0213982 | A1* | 9/2005 | Weber .................. H04B 10/801 398/135 |
| 2006/0037589 | A1 | 2/2006 | Gupta |
| 2006/0159460 | A1* | 7/2006 | Stewart ........... H04B 10/07955 398/135 |
| 2007/0033425 | A1 | 2/2007 | Clark |
| 2007/0193872 | A1 | 8/2007 | Garcia |
| 2007/0280695 | A1 | 12/2007 | Li |
| 2009/0196008 | A1 | 8/2009 | McColloch |
| 2009/0279218 | A1 | 11/2009 | Ferru |
| 2010/0091747 | A1 | 4/2010 | Dorsey |
| 2010/0155033 | A1 | 6/2010 | Holley |
| 2010/0172652 | A1 | 7/2010 | Wong |
| 2011/0135316 | A1 | 6/2011 | Fankhauser |
| 2011/0164382 | A1 | 7/2011 | Pirillis |
| 2011/0317348 | A1 | 12/2011 | Pratt |
| 2012/0058670 | A1 | 3/2012 | Regnier |
| 2012/0182688 | A1 | 7/2012 | McColloch |
| 2013/0000871 | A1 | 1/2013 | Olson |
| 2013/0322500 | A1 | 12/2013 | Gammel |
| 2013/0336650 | A1 | 12/2013 | Azadeh |

OTHER PUBLICATIONS

PCT/US2013/042935 Patent Cooperation Treaty, International Search Report and Written Opinion of the International Searching Authority, dated Aug. 2, 2013.

V.G. Pastukhov, Yu.F. Maidanik, C.V. Vershinin, M.A. Korukov, Minature Loop Heat Pipes for Electronics Cooling, Dec. 27, 2002.

Banjerd Saengchandr, Nitin V. Afzulpurkar, A Novel Approach for Cooling Electronics Using a Combined Heat Pipe and Thermoelectric Module, 2009.

Gajanana C. Birur, Michael T. Pauken, Keith S. Novak, Thermal Control of Mars Rovers and Landers Using Mini Loop Heat Pipes, May 19, 2002.

* cited by examiner

LOW-POWER FIBER OPTIC TRANSCEIVER

RELATED APPLICATION

This application claims priority under 35 U.S.C. § 119 to U.S. Provisional Patent Application No. 62/378,521 filed on Aug. 23, 2016, titled "Low Power Fiber Optic Transceiver," which application is hereby incorporated by reference in its entirety.

TECHNICAL FIELD

The present application pertains to low-power fiber optic transmitters, receivers, and transceivers.

BRIEF DESCRIPTION OF THE DRAWINGS

Non-limiting and non-exhaustive embodiments of the disclosure are described, including various embodiments of the disclosure with reference to the figures included in the detailed description.

DETAILED DESCRIPTION

Figure 1:
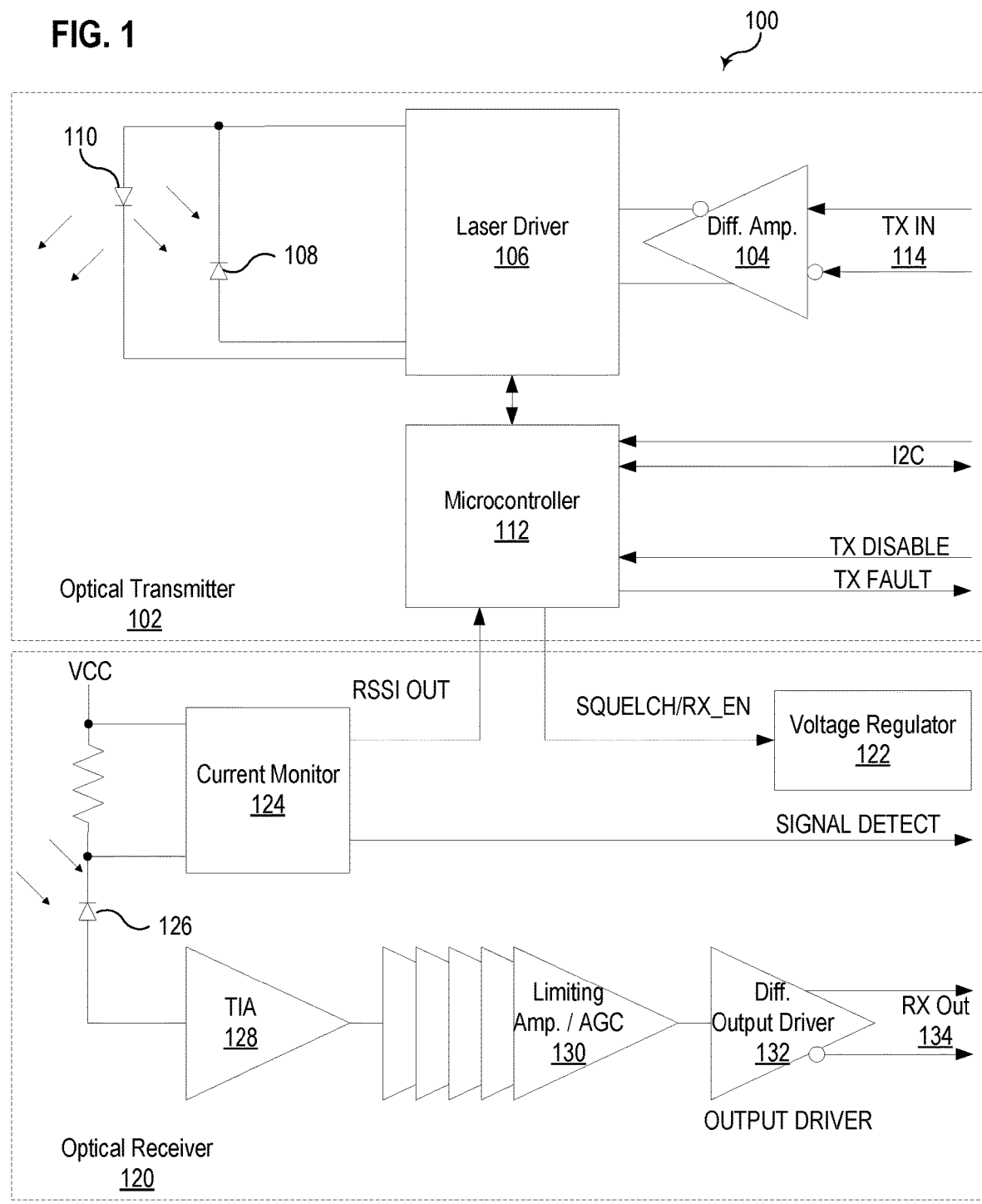
FIG. 1 illustrates a functional block diagram of a low-power fiber optic transceiver consistent with embodiments of the present disclosure.

Communication devices within industrial environments may be configured to accomplish several key goals. Specifically, such devices should transfer data at a high rate between devices with minimum potential for errors. High-speed communication devices are increasingly important as increased amounts of data are transferred between devices. Further, such devices should operate consistently and reliably over a broad ambient temperature range. The temperature range in certain embodiments may range from −40° to +85° C. Still further, such devices should be resistant to outside electrical interference with minimum effect on data integrity. Finally, such devices should consume a minimum amount of power. Reducing heating may avoid contributing excessive heat to other components.

Various embodiments of the present disclosure relate to reducing power consumption at high data rates. With an increased data rate and many data channels in a device such as an Ethernet switch, it is a significant challenge to design a system that does not violate the maximum operating temperature. For this reason, the chief figure of merit (FOM) used in the present disclosure is "Megabits per second per Watt" (Mbps/W).

Communication devices may use several methods to transfer data, including electrical signaling along wires, wireless signaling through the air, and/or optical signaling through plastic or glass fiber. Optical signaling is considered the most reliable method due to its immunity to electrical interference; however, optical signaling typically offers the lowest Mbps/W in comparison to electrical or wireless signaling. Table 1 illustrates examples of power consumption of standard commercially available optical transceivers.

TABLE 1

| Optical Protocol | Typ Max Data Rate (~1 Km distance) | Current (A) | Operating Voltage (V) | Power per Transceiver (W) | Figure of Merit (Mbps/W) |
|---|---|---|---|---|---|
| 10Base-FL | 10 Mbps | 0.22 | 5 | 1.1 | 9.1 |
| 100Base-FX | 100 Mbps | 0.21–0.3 | 3.3 | 0.7 to 1.0 | 143 to 100 |
| 1000Base-FX | 1000 Mbps | 0.3 | 3.3 | 1.0 | 1000 |

A communication device servicing multiple channels of communication, such as a switch, may include a transceiver for each port, and accordingly, the power consumed and the heat produced by the transceivers increases as the number of ports increases. For example, an Ethernet switch with 24 ports includes 24 transceivers, which will consume approximately 24 W of power. Considering a 1° C. rise per Watt, the temperature in the box will rise by 24° C. due to the transceivers alone. If the switch is operated at an ambient temperature of 25° C., the temperature range in the transceiver would be 49° C. This temperature is too hot to touch. If the ambient temperature is higher, the problem is exacerbated. For example, if the ambient temperature in which the switch operates is near the high operating range of many communication devices (e.g., 85° C.) the temperature inside the switch may exceed the temperature rating of the transceivers and/or other components in the switch.

Although active cooling or lower temperature ranges may be used to ameliorate these issues, these options have drawbacks. Relying on active cooling may reduce the reliability of the system, and reducing the operating temperature range may reduce the potential applications for various systems including optical transceivers. A preferable approach, therefore, is reducing the power consumed by the transceivers. This approach avoids the additional heating without restricting the operating temperature range of the device.

Various embodiments consistent with the present disclosure may significantly reduce power consumption of optical transceivers. In some embodiments, the power consumption may be reduced to approximately 0.2 Watts. In other embodiments, the power consumption may be reduced to approximately 0.05 Watts. The reduced power consumption may reduce heat generation and the temperature rise attributable to optical transceivers. For example, a 24-port switch including transceivers operating at 0.2 Watts may experience a temperature rise attributable to heat from optical transceivers of 4.8° C. If the transceivers in the switch operate at 0.05 Watts, the temperature increase may be only 1.2° C. Table 2 reflects the power consumption of various embodiments consistent with the present disclosure.

TABLE 2

| Optical Protocol | Typ Max Data Rate (~1 Km distance) | Current (A) | Operating Voltage (V) | Power per Transceiver (W) | Figure of Merit (Mbps/W) |
| --- | --- | --- | --- | --- | --- |
| 10Base-FL | 10 Mbps | 0.04 | 1.2 to 3.3 | 0.05 to 0.1 | 200 to 100 |
| 100Base-FX | 100 Mbps | 0.04-0.05 | 1.2 to 3.3 | 0.05 to 0.165 | 2000 to 606 |
| 1000Base-FX | 1000 Mbps | 0.04-0.06 | 1.2 to 3.3 | 0.05 to 0.198 | 20000 to 5050 |

Certain aspects of the embodiments described may be implemented as software modules or components. As used herein, a software module or component may include any type of computer instruction or computer executable code located within a memory device and/or transmitted as electronic signals over a system bus or wired or wireless network. A software module or component may, for instance, comprise one or more physical or logical blocks of computer instructions, which may be organized as a routine, program, object, component, data structure, etc., that performs one or more tasks or implements particular abstract data types.

In certain embodiments, a particular software module or component may comprise disparate instructions stored in different locations of a memory device, which together implement the described functionality of the module. Indeed, a module or component may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules or components may be located in local and/or remote memory storage devices. In addition, data being tied or rendered together in a database record may be resident in the same memory device, or across several memory devices, and may be linked together in fields of a record in a database across a network.

Embodiments may be provided as a computer program product including a non-transitory computer and/or machine-readable medium having stored thereon instructions that may be used to program a computer (or other electronic device) to perform processes described herein. For example, a non-transitory computer-readable medium may store instructions that, when executed by a processor of a computer system, cause the processor to perform certain methods disclosed herein. The non-transitory computer-readable medium may include, but is not limited to, hard drives, floppy diskettes, optical disks, CD-ROMs, DVD-ROMs, ROMs, RAMs, EPROMs, EEPROMs, magnetic or optical cards, solid-state memory devices, or other types of machine-readable media suitable for storing electronic and/or processor-executable instructions.

FIG. 1 illustrates a functional block diagram of a low-power fiber optic transceiver 100 consistent with embodiments of the present disclosure. Low-power transceiver 100 may embody a variety of techniques to reduce power consumption. In various embodiments, these techniques may be used individually, or multiple techniques may be used in the same device.

An optical transmitter 102 may include a differential amplifier 104 to condition an input signal 114. A laser driver 106 may set the modulation levels based on laser current and a monitor photodiode 108 configured to provide feedback from a laser diode 110. A microcontroller 112 may monitor and control operations of the optical transmitter 102.

An optical receiver 120 may include a voltage regulator 122 and a current monitor 124 in communication with microcontroller 112. Current monitor 124 may indicate the average optical input power and generate a received signal strength indication (RSSI) that is provided to microcontroller 112. Based on the RSSI, the microcontroller 112 may generate a squelch function to turn off the receiver if the input signal falls below a specified threshold. A voltage regulator 122 may provide a lower and clean voltage to the amplifiers. In various embodiments, voltage regulator 122 may be embodied as a linear or switching voltage regulator. Still further, the voltage regulator 122 may increase or decrease a supply voltage provided to optical receiver 120.

A detector photodiode 126 may convert light input to an electrical signal. The electrical signal from the detector photodiode 126 may pass to a trans-impedance amplifier (TIA) 128 to convert photodiode current to a voltage. A limiting amplifier and/or automatic gain control circuit (AGC) 130 may amplify the photodiode voltage until a constant amplitude square wave is obtained. A differential output driver 132 may generate an output 134.

In various embodiments, some functionality performed by separately illustrated components may be incorporated into microcontroller 112. For example, certain functionality associated with laser driver 106, differential amplifier 104, and other components may be implemented in microcontroller 112. Further, the microcontroller 112 may monitor the operational voltage, temperature, laser current and optical output, and adjust the laser drive voltage and control the drive transistor bias voltage to optimize the output. Still further, the microcontroller 112 may control a switching laser current regulator (not shown) to further reduce power consumption. In embodiments in which the illustrated components are implemented using distinct components, a power budget is provided in Table 3.

TABLE 3

| Component | Power Budget |
| --- | --- |
| Differential Amplifier 104 | 20 mA |
| Laser Driver 106 and Laser Diode 108 | 60 mA |
| Microcontroller 112 | 20 mA |
| Total for Optical Transmitter 102 | 100 mA |
| TIA 128 | 40 mA |
| Limiting Amplifier 130 | 60 mA |
| Differential Output Driver 132 | 40 mA |
| Current Monitor 124 | 10 mA |
| Voltage Regulator 122 | 0 (Not Required) |
| Total for Optical Receiver | 150 mA |
| Transceiver Total | 250 mA |

Figure 2A:
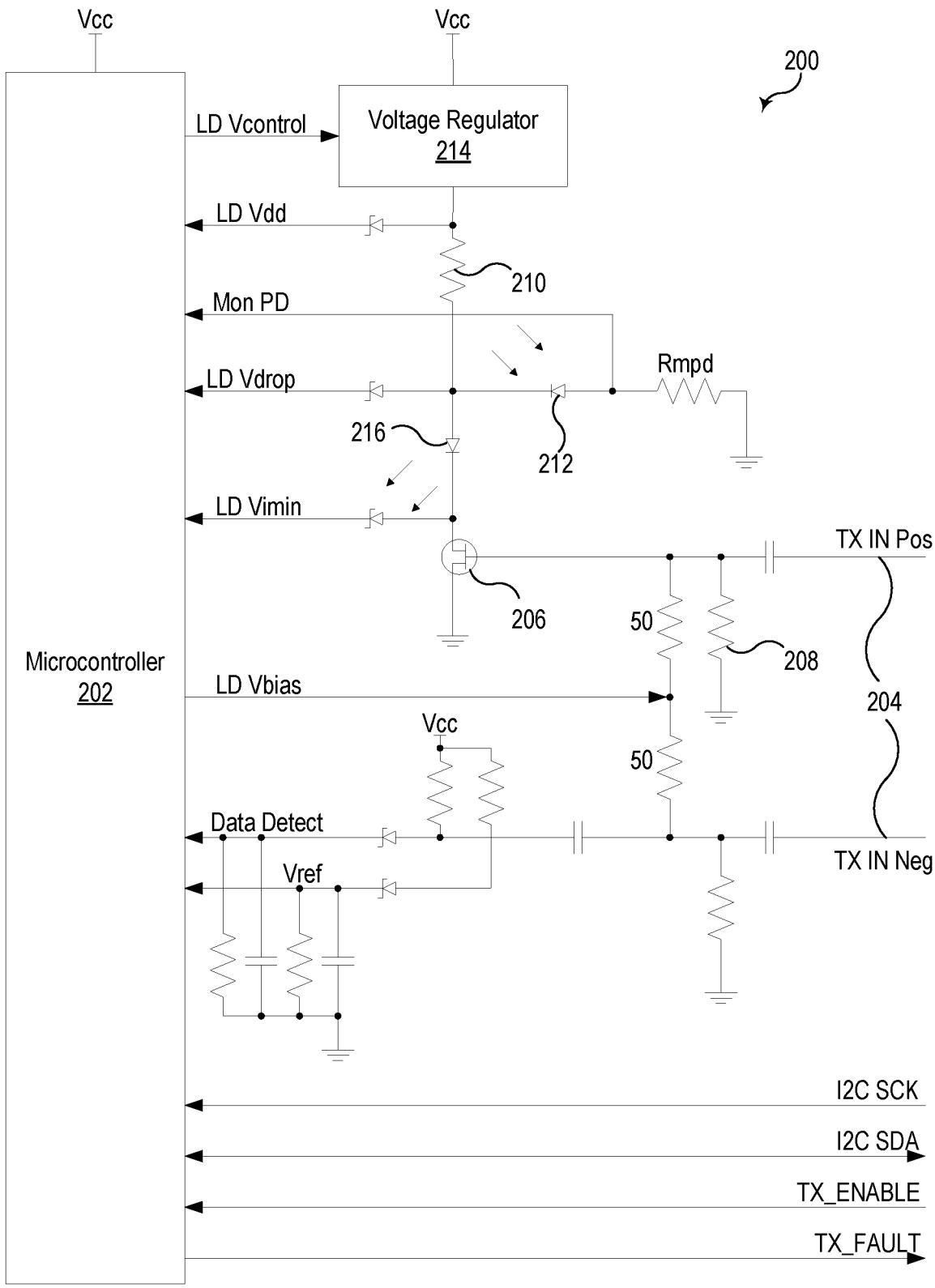
FIG. 2A illustrates a simplified circuit diagram of a low-power fiber optic transmitter consistent with embodiments of the present disclosure.

FIG. 2A illustrates a simplified circuit diagram of a low-power fiber optic transmitter 200 consistent with embodiments of the present disclosure. As described above, in the illustrated embodiment, various functional elements associated with a transceiver may be implemented using microcontroller 202. For example, a differential amplifier may be implemented in part using microcontroller 202. Microcontroller 202 may operate using any number of processing rates and architectures. Microcontroller 202 may be configured to perform any of the various algorithms and calculations described herein. Microcontroller 202 may be embodied as a general purpose integrated circuit, an application-specific integrated circuit, a field-programmable gate array, and/or any other suitable programmable logic device. The microcontroller 202 may be embodied as an application specific integrated circuit (ASIC).

In the illustrated embodiment, a TX input signal 204 may directly drive a laser modulation field-effect transistor (FET) 206. Power to the laser modulation FET 206 may be provided by voltage regulator 214, which may be embodied using a variety of technologies to adjust a supply voltage to a suitable level. In some embodiments, the specific voltage may depend on the minimum voltage associated with certain components (e.g., a laser diode 216). In embodiments in which the supply voltage is lower than the necessary voltage, voltage regulator 214 may increase the voltage (e.g., using a step-up converter). Similarly, in embodiments in which the supply voltage is greater than the required voltage, voltage regulator 214 may decrease the voltage (e.g., using a step-down converter).

The laser modulation FET 206 may control current through a laser diode 216. In various embodiments, FET 206 may be embodied using high-speed Silicon-Germanium or pseudomorphic high-electron-mobility transistor (PHEMT). SeGe and PHEMT transistors may provide amplification while reducing power consumption in comparison to a discrete amplifier. In other embodiments, FET 206 may be embodied using other types of transistors, including bipolar junction transistors (BJT). Characterization data for the laser diode 216 and FET 206 may be programmed into the microcontroller 202 to further enhance performance over process and temperature. In some embodiments, the characterization data may be programmed during calibration or commissioning.

In one specific embodiment, a high-speed PHEMT FET 206 is driven directly by one side of a differential terminal input 204 having a standard input impedance 208. In one specific embodiment, the standard input impedance 208 may be 100Ω, as specified by the CFP Multi-Source Agreement (MSA). The PHEMT FET 206 bias voltage may be set by a microcontroller 202 algorithm that measures the average current of the laser diode 216 based on the voltage drop across resistor 210 and laser diode 216 minimum current (using Vimin). Due to process variation in the threshold voltage of FET 206, the algorithm may be based on a temperature, the "data detect" voltage, and the supply voltage in certain embodiments. The temperature may be monitored by the microcontroller 202. The microcontroller 202 also sets the average current through laser diode 216 using the signal LD Vcontrol and feedback from the monitor photodiode 212. Accordingly, in the illustrated embodiment, the microcontroller 202 may control an output power of the laser diode 216 using the signal LD Vcontrol.

The microcontroller 202 monitors the "Data Detect" signal relative to a reference voltage, Vref, and may turn off the transistor bias (LD Vbias) and/or may signal to voltage regulator 214, using the LD Vcontrol signal, to disable the laser diode 216 off when no data is present on the input 204.

Figure 2B:
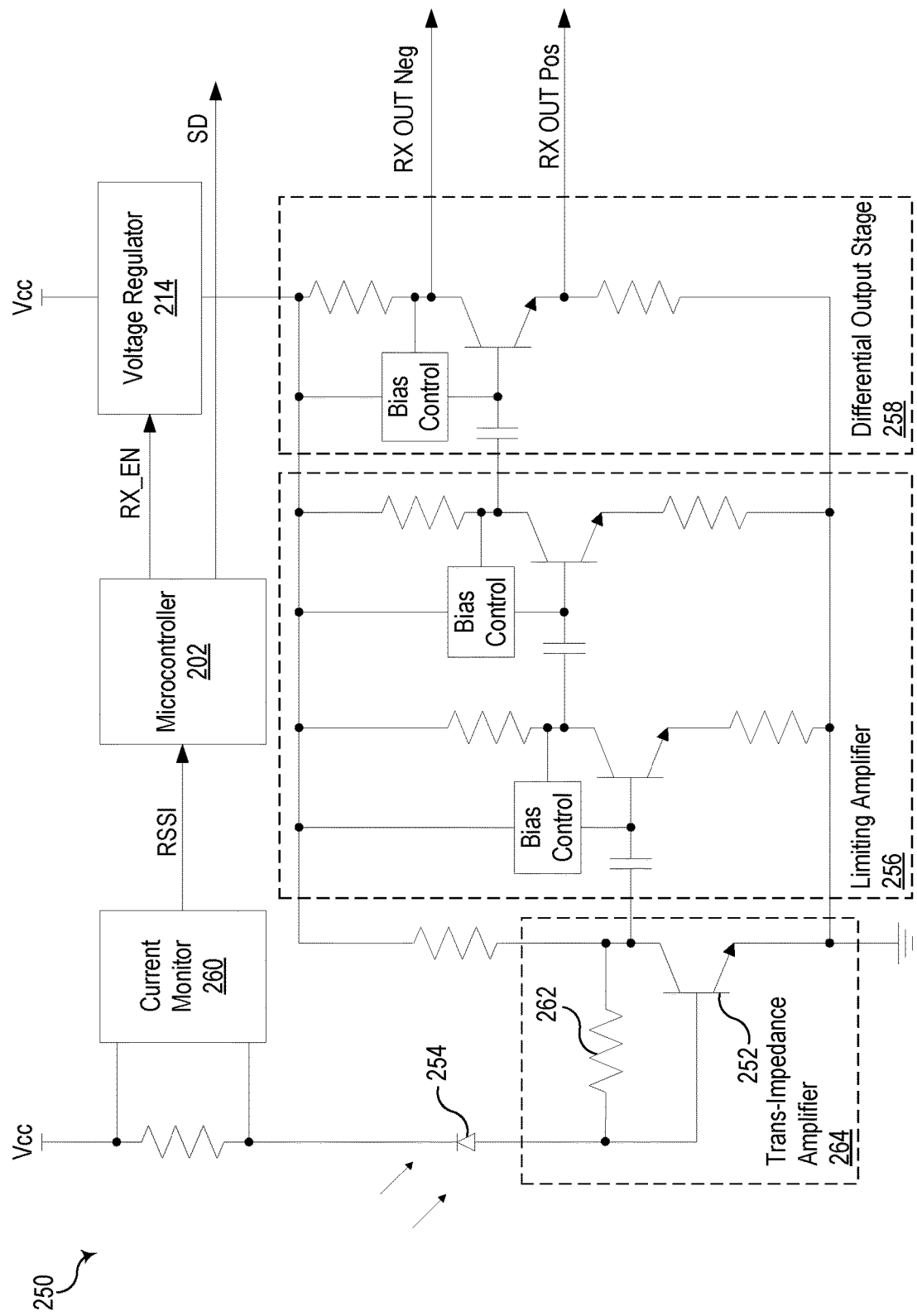
FIG. 2B illustrates a simplified circuit diagram of a low-power fiber optic receiver consistent with embodiments of the present disclosure.

FIG. 2B illustrates a simplified circuit diagram of a low-power fiber optic receiver 250 consistent with embodiments of the present disclosure. The receiver 250 of the transceiver includes a trans-impedance amplifier (TIA) 264 to convert photodiode 254 current to a voltage. The gain of TIA 264 may be a function of resistor 262. A limiting amplifier 256 may amplify the photodiode voltage until a constant amplitude square wave is obtained. In various embodiments, an automatic gain control may be used in place of limiting amplifier 256. A differential output stage 258 may be coupled to the limiting amplifier 256. In various embodiments, the differential output stage 258 may comprise a single-ended amplifier chain. A current monitor 260 may be configured to indicate the average optical input power, which provides a "Received Signal Strength Indication" (RSSI) and a squelch function to turn off the receiver if the input signal falls below a certain level. Voltage regulator 214 may provide power to the limiting amplifier 256 and the differential output stage. In one specific embodiment, voltage regulator 214 may comprise a low-noise drop out (LDO) voltage regulator.

Power savings in optical receiver 250 may be realized in at least three specific ways. First, the use of a voltage regulator 214 allows the transmitter 200 to accept voltages between 1.2V and 3.3V, reducing power consumption in the receiver when a lower voltage power source is available, while still conforming to the standard requirement of 3.3V. Voltage regulator 214 may provide amplification of an incoming optical signal using the photodiode 254 using a low voltage and a high-speed transistor 252. Further, the receiver 250 may avoid the use of differential stages in the receiver amplifier 256 to reduce power rail noise. The output of the voltage regulator 214 may allow a single-ended chain, thus reducing both power consumption and cost. The differential output stage 258 may utilize a single transistor that creates differential signals from the same current branch, sourced from voltage regulator 214, cutting the current requirement in half, also saving multiple stages that are otherwise usually required.

Second, the differential output stage 258 may operate using a single transistor that creates differential signals from the same current branch, sourced from voltage regulator 214. Optical receivers commonly incorporate a differential output stage that drives output lines with a pair of transistors and multiple stages. Accordingly, the use of a single transistor may reduce by half the current and also may avoid multiple stages.

Finally, a low-power current monitor 260 may be used to detect the average current from the photodiode 254, and the microcontroller 202 may disable the voltage regulator when the RSSI level drops below a set level. Typically, the current monitor and squelch function is accomplished with a differential amplifier and a comparator. In another embodiment, the comparator in the current monitor 260 could be integrated into the microcontroller 202. In yet another embodiment, the differential amplifier as well as the comparator in the current monitor 260 could be integrated into the microcontroller 202. Together, they consume 10 mA. In the illustrated embodiment, a current monitor 260 detects the average current, and the microcontroller 202 from the transmitter side disables the voltage regulator 214 when the RSSI level drops below a set level.

Table 4 provides a power budget for the fiber optic transceiver shown in FIGS. 2A and 2B.

TABLE 4

| Component | Described Embodiment |
|---|---|
| Input Differential Amplifier | 1 mA |
| Laser Driver and Laser Diode | 14 mA |
| Microcontroller | 5 mA |
| Total for Optical Transmitter | 20 mA |
| TIA | 5 mA |
| Limiting Amplifier | 15 to 25 mA |
| Differential Output Driver | 7 mA |
| Current Monitor/Squelch | 1 mA |
| Voltage Regulator | 2 mA |
| Total for Optical Receiver | 30 to 40 mA |
| Total Transceiver Current | 50 to 60 mA |

Various embodiments consistent with the present disclosure may comply with applicable standards and/or multi-source agreements (MSA). In such embodiments, the systems and methods disclosed herein may be implemented in standard small form factor ("SFF") or small form-factor pluggable ("SFP") packages, and may be interoperable with existing hardware. Replacement of existing transceivers with transceivers consistent with the present disclosure may be used to upgrade existing hardware already in service.

While specific embodiments and applications of the disclosure have been illustrated and described, it is to be understood that the disclosure is not limited to the precise configurations and components disclosed herein. One of skill in the art will recognize that a variety of specific implementations may be created consistent with the present disclosure. Accordingly, many changes may be made to the details of the above-described embodiments without departing from the underlying principles of this disclosure. The scope of the present invention should, therefore, be determined only by the following claims.

What is claimed is:

1. A low-power optical transceiver, comprising:
a microcontroller;
an optical receiver in communication with and controlled by the microcontroller and further comprising:
a photodetector configured to receive a first optical representation of a first signal to be received and to generate an electrical representation of the first signal;
an amplifier configured to amplify the electrical representation of the first signal;
an output port in electrical communication with the amplifier and configured to generate an electrical output; and
an optical transmitter in communication with and controlled by the microcontroller and further comprising:
a laser modulation field-effect transistor (FET) comprising a gate driven directly by a second signal to be transmitted;
a laser diode in electrical communication with the laser modulation FET such that the current through the laser diode controlled by the laser modulation FET and configured to generate a second optical representation of the second signal;
wherein the microcontroller is configured to control a supply voltage in electrical communication with the laser modulation FET and the microcontroller is configured to monitor a current associated with the photodetector of the optical receiver and to selectively generate a squelch function operable to selectively disable the optical receiver when the current is below a threshold.

2. The low-power optical transceiver of claim 1, wherein the optical transceiver further comprises a voltage regulator configured to enable operation at a range between 1.2 V and 3.3 V.

3. The low-power optical transceiver of claim 1, further comprising a single-ended amplifier chain.

4. The low-power optical transceiver of claim 3, wherein the single-ended amplifier chain comprises a final stage of a differential output.

5. The low-power optical transceiver of claim 1, wherein the microcontroller is further configured to monitor a temperature of the laser modulation FET and to adjust the current through the laser modulation FET based on the temperature.

6. The low-power optical transceiver of claim 1, wherein the laser modulation FET comprises one of a pseudomorphic high-electron-mobility transistor and a SiGe transistor.

7. The low-power optical transceiver of claim 1, wherein the microcontroller is configured to receive characterization data of the laser diode and configured to adjust at least one operating parameter of the laser diode based on the characterization data.

8. The low-power optical transceiver of claim 1, wherein the output of the receiver comprises a differential output stage comprising a first output connected to a first terminal of an output transistor and a second output connected to a second terminal of the output transistor.

9. The low-power optical transceiver of claim 1, wherein the receiver further comprises a current monitor associated with the photodetector; and wherein the microcontroller is further configured to generate a plurality of samples of the current monitor and to selectively generate the squelch function when the plurality of samples indicate the current is below the threshold.

10. The low-power optical transceiver of claim 1, wherein the transceiver is configured to achieve between 200 megabits per second per watt (Mpbs/W) and 100 Mbps/W for a 10Base-FL optical protocol.

11. The low-power optical transceiver of claim 1, wherein the transceiver is configured to achieve between 2,000 megabits per second per watt (Mpbs/W) and 606 Mbps/W for a 100Base-FL optical protocol.

12. The low-power optical transceiver of claim 1, wherein the transceiver is configured to achieve between 20,000 megabits per second per watt (Mpbs/W) and 5,050 Mbps/W for a 1000Base-FL optical protocol.

13. The low-power optical transceiver of claim 1, wherein the amplifier of the optical receiver comprises a transimpedance amplifier followed by at least one limiting gain stage.

14. The low-power optical transceiver of claim 1, wherein the microcontroller comprises an application specific integrated circuit.

15. A low-power optical transceiver, comprising: a microcontroller; an optical receiver in communication with and controlled by the microcontroller and further comprising: a photodetector configured to receive a first optical representation of a first signal to be received and to generate an electrical representation of the first signal; an amplifier configured to amplify the electrical representation of the first signal; an output port in electrical communication with the amplifier and configured to generate an electrical output; and an optical transmitter in communication with and controlled by the microcontroller and further comprising: a laser modulation field-effect transistor (FET) comprising a gate driven directly by a second signal to be transmitted; a laser diode in electrical communication with the laser modulation FET such that the current through the laser diode controlled by the laser modulation FET and configured to generate a second optical representation of the second signal; wherein the microcontroller is configured to control a supply voltage in electrical communication with the laser modulation FET and to receive characterization data of the laser diode and configured to adjust at least one operating parameter of the laser diode based on the characterization data; wherein the microcontroller is configured to monitor a current associated with the photodetector of the optical receiver and to selectively generate a squelch function operable to selectively disable the optical receiver when the current is below a threshold.

16. The low-power optical transceiver of claim 15, further comprising a single-ended amplifier chain.

17. The low-power optical transceiver of claim 15, wherein the microcontroller is configured to receive characterization data of the laser diode and configured to adjust at least one operating parameter of the laser diode based on the characterization data.

18. The low-power optical transceiver of claim 15, wherein the output of the receiver comprises a differential output stage comprising a first output connected to a first terminal of an output transistor and a second output connected to a second terminal of the output transistor.

19. The low-power optical transceiver of claim 15, wherein the receiver further comprises a current monitor associated with the photodetector, and wherein the microcontroller is further configured to generate a plurality of samples of the current monitor and to selectively generate the squelch function when the plurality of samples indicate the current is below the threshold.

20. The low-power optical transceiver of claim 1, further comprising:
a transistor coupled with the input signal, the laser diode, and ground;
wherein the input signal directly controls a current through the laser diode and the transistor.

21. The low-power optical transceiver of claim 1, further comprising a voltage regulator in communication with the microcontroller;
wherein the microcontroller receives the input signal and disables the voltage regulator when the input signal is inactive.

22. The low-power optical transceiver of claim 3, wherein the single-ended amplifier chain generates a differential signal from two leads of a single transistor.

23. The low-power optical transceiver of claim 1 wherein the microcontroller receives the input signal and disables the laser diode reducing a bias signal applied to the laser modulation FET.

* * * * *